(12) United States Patent
Lai

(10) Patent No.: US 9,207,425 B2
(45) Date of Patent: Dec. 8, 2015

(54) LENS BARREL AND LENS MODULE

(75) Inventor: Chien-Nan Lai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 311 days.

(21) Appl. No.: 13/472,489

(22) Filed: May 16, 2012

(65) Prior Publication Data

US 2013/0258502 A1    Oct. 3, 2013

(51) Int. Cl.
*G02B 7/02*    (2006.01)

(52) U.S. Cl.
CPC ..................... *G02B 7/021* (2013.01)

(58) Field of Classification Search
USPC .......................... 359/811, 815, 819–826, 813
See application file for complete search history.

(56) References Cited

U.S. PATENT DOCUMENTS

| 2006/0216014 A1* | 9/2006 | Morinaga et al. | 396/144 |
| 2011/0013295 A1* | 1/2011 | Chou | 359/819 |
| 2012/0133825 A1* | 5/2012 | Nakajima et al. | 348/374 |
| 2012/0314122 A1* | 12/2012 | Yamashita | 348/360 |

* cited by examiner

*Primary Examiner* — Joseph P Martinez
*Assistant Examiner* — Brandi Thomas
(74) *Attorney, Agent, or Firm* — Novak Druce Connolly Bove + Quigg LLP

(57) ABSTRACT

An exemplary lens barrel includes a hollow main body and an abutting portion formed on an outer wall of the hollow main body. The hollow main body includes a first upper end at an object side, and a first lower end at an image side. The hollow main body also includes a central axis passing through the first upper end and the first lower end. The hollow main body further includes an outer screw thread. The outer screw thread is located between the first upper end and the abutting portion. The outer screw thread is spaced apart from the abutting portion. The abutting portion is a closed ring-shaped protrusion extending outwardly from the outer wall along a circumstance of the hollow main body.

6 Claims, 3 Drawing Sheets

LENS BARREL AND LENS MODULE

BACKGROUND

1. Technical Field

The present disclosure relates to the field of photography, and particularly to a lens barrel and a lens module with the lens barrel.

2. Description of Related Art

Camera modules are used in various kinds of electric devices, such as digital cameras, cell phones, laptop computers, for example.

A camera module typically includes a lens module and an image sensor received in a lower end of the lens module. The lens module includes a lens holder, a lens barrel received in the lens holder, and at least one lens received in the lens barrel. The lens holder includes a plurality of inner screw threads. The lens barrel includes a plurality of outer screw threads engaging with the inner screw threads. During assembly of the lens module, the lens barrel is threaded into the lens holder. Due to a friction between the lens barrel and the lens holder, there are many plastic particles generated between the lens barrel and the lens holder. The plastic particles easily drop onto the image sensor, thereby making the image sensor generate noise. The image quality of the lens module is thus lower. In addition, during the assembly of the lens module, a central axis of the lens barrel may too easily be inclined relative to the image sensor, thereby reducing imaging quality of the lens module.

What is needed, therefore, is a new lens barrel, and a new lens module, which can overcome the above-described problem.

DETAILED DESCRIPTION

Embodiments will now be described in detail below with reference to the drawings.

Figure 1:
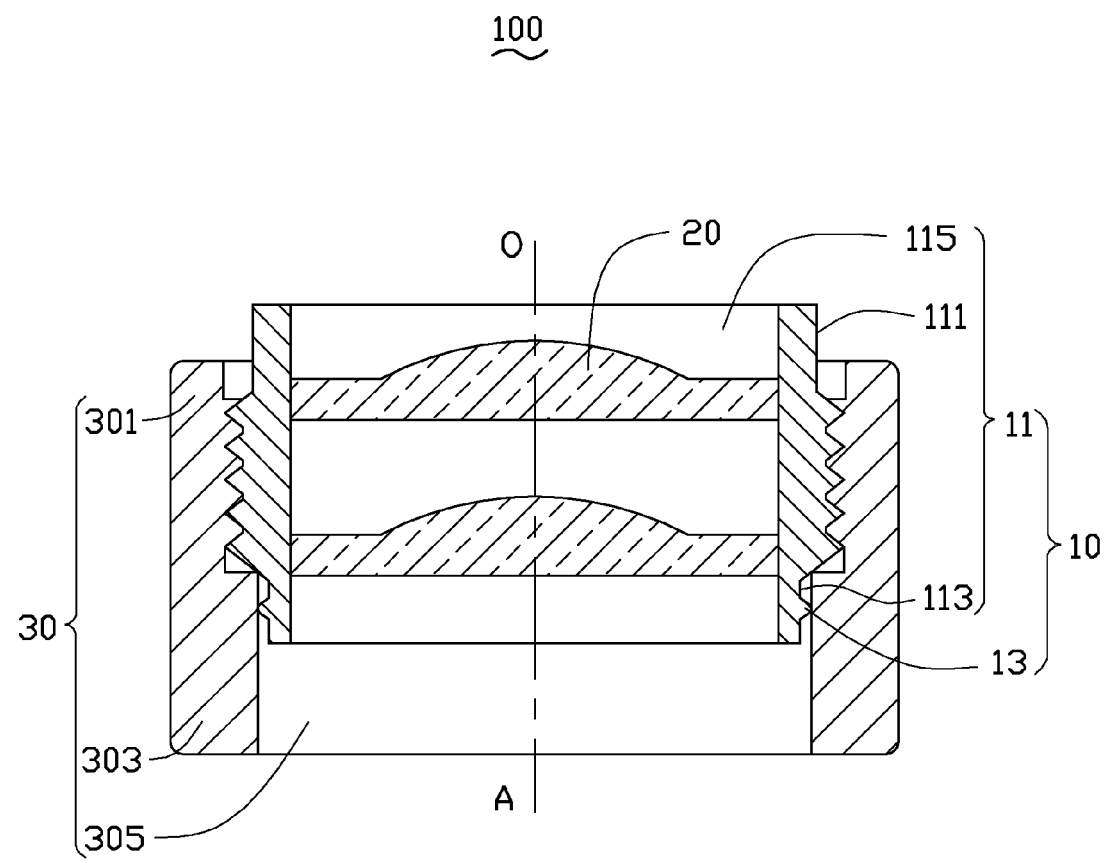
FIG. 1 is a schematic view of a lens module according to an exemplary embodiment.
Figure 2:
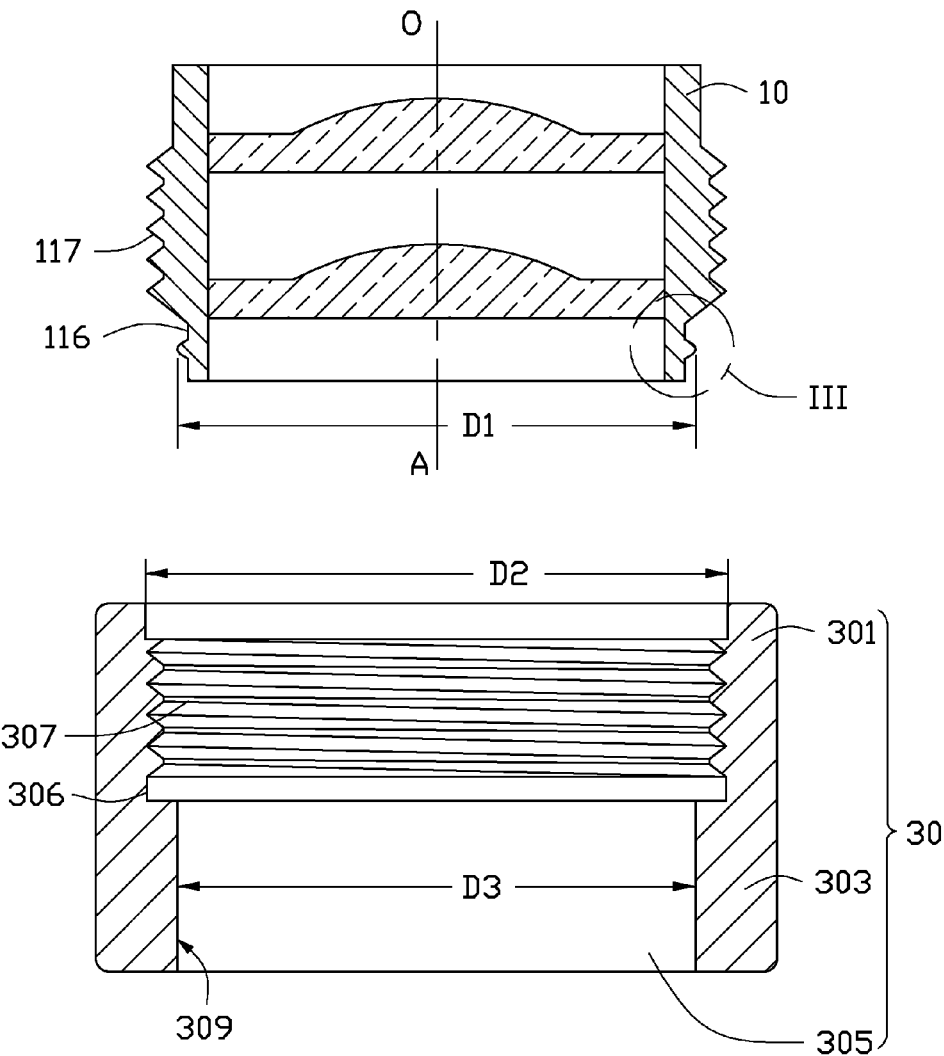
FIG. 2 is an exploded schematic view of the lens module of FIG. 1.

FIGS. 1 and 2, illustrate a lens module 100, in accordance with an exemplary embodiment. The lens module 100 includes a lens barrel 10, at least one lens 20 received in the lens barrel 10, and a lens holder 30.

The lens barrel 10 includes a hollow main body 11 and a abutting portion 13 formed on the hollow main body 11. In the present embodiment, the hollow main body 11 is integrally formed with the abutting portion 13.

The hollow main body 11 is a cylindrical body, and includes a first upper end 111 at an object side, a first lower end 113 at an image side, and a first receiving cavity 115 passing through the first upper end 111 and the first lower end 113 for receiving the at least one lens 20. The hollow main body 11 also includes an outer wall 116 surrounding the first receiving cavity 115 and an outer screw thread 117 formed on the outer wall 116.

The abutting portion 13 is a closed ring-shaped protrusion, and is formed on the outer wall 116 of the hollow main body 11. In detail, the abutting portion 13 is a closed ring-shaped protrusion outwardly extending from the outer wall 116 along a circumstance of the hollow main body 11. The outer diameter of the abutting portion 13 is denoted as "D1".

Figure 3:
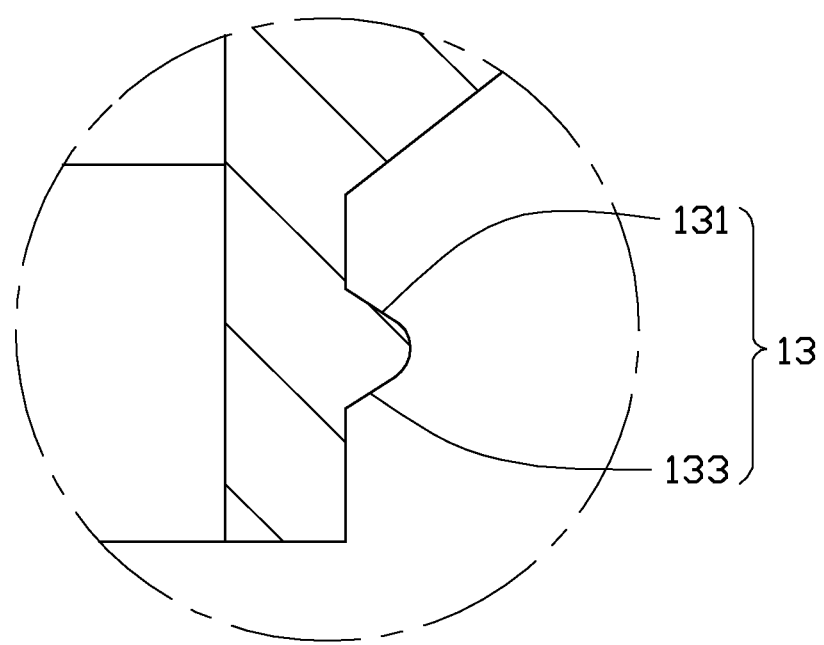
FIG. 3 is an enlarge view of the circled portion III of FIG. 2.

FIG. 3, shows the abutting portion 13 includes a first surface 131 and a second surface 133 adjoining the first surface 131. The first surface 131 is far away from the first lower end 113. The second surface 133 is near the first lower end 113.

The first surface 131 is a ring-shaped surface surrounding a central axis OA of the lens barrel 10 which passes through the first upper end 111 and the first lower end 113. An outline of a cross section of the first surface 131 taken by a plane through the central axis OA can be a straight line inclined relative to the central axis OA, a curved line, or a straight line perpendicular to the central axis OA. That is, the first surface 131 can be a curved surface, and can also be a flat plane.

The second surface 133 is a ring-shaped surface surrounding the central axis OA. An outline of a cross section of the second surface 133 taken by the plane through the central axis OA can be a straight line inclined relative to the central axis OA, a curved line, or a straight line perpendicular to the central axis OA. That is, the second surface 133 can be a curved surface, and can also be a flat plane.

In order to easily assemble the lens barrel 10 to the lens holder 30, and form a smaller abutting surface between the abutting portion 13 and the lens holder 30, in the present embodiment, the width of the abutting portion 13 in a direction parallel with the central axis OA gradually decreases along a direction away from the central axis OA. That is, the abutting portion 13 tapers along the direction away from the central axis OA.

In the present embodiment, an outline of a cross section of the abutting portion 13 taken by a plane through the central axis OA is a parabolic line, the opening of which faces the central axis OA.

The outer screw thread 117 is located between the first upper end 111 and the abutting portion 113, and is spaced apart from the abutting portion 113. The outer screw thread 117 is configured for threadedly engaging with the lens holder 30.

The lens holder 30 is a cylindrical body, and includes a second upper end 301 at the object side, a second lower end 303 at the image side, a second receiving cavity 305 passing through the second upper end 301 and the second lower end 303. The inner diameter of the second upper end 301 is denoted as "D2". The inner diameter of the second lower end 303 is denoted as "D3". The lens holder 30 also includes an inner wall 306 and an inner screw thread 307 formed on the inner wall 306 for threadedly engagingly with the outer screw thread 107.

The inner screw thread 307 is located between the second upper end 301 and the second lower end 303, and is near the second upper end 301.

The inner wall 306 of the second lower end 303 has a slippery surface 309, and D3 is equal to or smaller than D1, such that the slippery surface 309 of the inner wall 306 of the second lower end 303 can abut against the abutting portion 13. It can readily be understood that the slippery surface 309 of the second lower end 303 can abut against the abutting portion 13 by interference fit when D3 is smaller than D1.

In order to prevent plastic particles generated in the assembly of the lens holder 30 and the lens barrel 10 from dropping onto an image sensor (not shown), is the fact that D3 is smaller than D2, in such a way that the second receiving cavity 305 is a stepped shaped cavity with wide top and narrow bottom.

In order to easily assemble the lens barrel 10 to the lens holder 30, a projection of the inner screw thread 307 on a plane perpendicular to the central axis OA is in a projection of the outer screw thread 117 on the plane perpendicular to the central axis OA. That is, the outer diameter of the outer screw thread 117 is bigger than the outer diameter of the inner screw thread 307.

In alternative embodiments, the hollow main body 11 and the abutting portion 13 may be produced separately, and then are fixed to each other by screws or adhesives to form the lens barrel 10.

The material of the abutting portion 13 can be resin, metal, or inorganic non-metal, for example. In the present embodiment, the abutting portion 13 is made of resin.

In the present embodiment, the hollow main body 11 is made of resin. Therefore, the hollow main body 11 is integrally formed with the abutting portion 13.

In a process of assembling the lens module 100, the at least one lens 20 is first assembled into the first receiving cavity 115, and then the first lower end 113 is screwed into the second receiving cavity 115 from the second upper end 301, thereby obtaining the lens module 100.

Because the abutting portion 13 abuts against the slippery surface 309 of the lens holder 30, the plastic particles generated in the assembly of the lens barrel 10 and the lens holder 30 are prevented from dropping onto the image sensor. The noise of the image sensor can be eliminated, and the image equality of the image sensor can thus be improved. In addition, the abutting portion 13 prevents the lens barrel 10 from inclining relative to the lens holder 30, and the image equality of the lens module 100 is guaranteed.

While certain embodiments have been described and exemplified above, various other embodiments will be apparent to those skilled in the art from the foregoing disclosure. The disclosure is not limited to the particular embodiments described and exemplified but is capable of considerable variation and modification without departure from the scope and spirit of the appended claims.

What is claimed is:

1. A lens barrel comprising:
a hollow main body, the hollow main body being a cylindrical body and comprising a first upper end at an object side, and a first lower end at an image side, the hollow main body including a central axis passing through the first upper end and the first lower end, the hollow main body further comprising an outer wall and an outer screw thread formed on the outer wall, and
an abutting portion formed on the an outer wall, the outer screw thread being located between the first upper end and the abutting portion, the outer screw thread being spaced apart from the abutting portion, the abutting portion being a closed ring-shaped protrusion protruding outwardly from an outer circumferential surface of the outer wall along a radial direction of the hollow main body; wherein the abutting portion comprises a first surface and a second surface adjoining the first surface, the second surface is closer to the first lower end than the first surface, and the first surface and the second surface are ring-shaped surfaces, the abutting portion tapers along a direction away from the central axis, and an outline of a cross section of the abutting portion taken by a plane through the central axis is a parabolic line, the opening of which faces the central axis.

2. A lens module comprising:
a lens barrel comprising:
a hollow main body, the hollow main body being a cylindrical body and comprising a first upper end at an object side, and a first lower end at an image side, the hollow main body including a central axis passing through the first upper end and the first lower end, the hollow main body further comprising an outer wall having an outer screw thread formed thereon, and an abutting portion formed on the outer wall, the outer screw thread being located between the first upper end and the abutting portion, the outer screw thread being spaced apart from the abutting portion, the abutting portion being a closed ring-shaped protrusion protruding outwardly from an outer circumferential surface of the outer wall along a radial direction of the hollow main body; wherein the abutting portion comprises a first surface and a second surface adjoining the first surface, the second surface is closer to the first lower end than the first surface, and the first surface and the second surface are ring-shaped surfaces, the width of the abutting portion in a direction parallel with the central axis gradually decreases along a direction away from the central axis, an outline of a cross section of the abutting portion taken by a plane through the central axis is a parabolic line, the opening of which faces the central axis; and
a lens holder, the lens holder comprising a second upper end at the object side, and a second lower upper end at the image side, the lens holder further comprising an inner wall and an inner screw thread formed on the inner wall for threadedly engaging with the outer screw thread, the inner wall of the second lower end having a slippery surface, and the abutting portion abutting against the slippery surface of the inner wall.

3. The lens barrel of claim 1, wherein the outer diameter of the outer screw thread is larger than the outer diameter of the abutting portion.

4. The lens module of claim 2, wherein the lens holder is a cylindrical body, and the slippery surface is an inner circumferential surface of the second lower end.

5. The lens module of claim 2, wherein the outer diameter of the outer screw thread is larger than the outer diameter of the abutting portion.

6. The lens module of claim 2, wherein the inner diameter of the second lower end is equal to the outer diameter of the abutting portion.

* * * * *